US012654047B2

(12) United States Patent
Yu et al.

(10) Patent No.: US 12,654,047 B2
(45) Date of Patent: Jun. 16, 2026

(54) ENERGY STORAGE SYSTEM AND CONTROL METHOD THEREOF

(71) Applicant: Huawei Digital Power Technologies Co., Ltd., Shenzhen (CN)

(72) Inventors: Shijiang Yu, Shanghai (CN); Shuai Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 535 days.

(21) Appl. No.: 18/192,497

(22) Filed: Mar. 29, 2023

(65) Prior Publication Data

US 2023/0310912 A1      Oct. 5, 2023

(30) Foreign Application Priority Data

Mar. 29, 2022    (CN) .......................... 202210317571.2

(51) Int. Cl.
*A62C 3/16*              (2006.01)
*A62C 37/40*             (2006.01)
(Continued)

(52) U.S. Cl.
CPC ............... *A62C 3/16* (2013.01); *A62C 37/40* (2013.01); *G08B 17/06* (2013.01); *G08B 17/10* (2013.01);
(Continued)

(58) Field of Classification Search
CPC ........ G08B 17/10; G08B 21/16; A62C 37/00; A62C 35/023; H01M 50/383
See application file for complete search history.

(56) References Cited

U.S. PATENT DOCUMENTS

2016/0218528 A1*  7/2016  Sugeno ................... B60L 53/64
2021/0283441 A1    9/2021  Cao et al.
(Continued)

FOREIGN PATENT DOCUMENTS

CN          110227223  A      9/2019
CN          111628231  A      9/2020
(Continued)

OTHER PUBLICATIONS

"Code for Design of Automatic Fire Alarm System," GB 50116-2013, National Standard of the People's Republic of China, total 106 pages (Sep. 6, 2013).

*Primary Examiner* — Mirza F Alam
(74) *Attorney, Agent, or Firm* — Leydig, Voit & Mayer, Ltd.

(57) ABSTRACT

An energy storage system includes a fire suppression system controller, a fire extinguishing apparatus, a first sensing unit configured to detect a temperature and smoke of the energy storage system, a second sensing unit configured to detect a thermal runaway parameter, an energy storage system controller, and an energy storage unit. When the thermal runaway parameter output by the second sensing unit meets a thermal runaway condition, the energy storage system controller sends alarm information to the fire suppression system controller, to stop energy charging or energy supply of the energy storage unit. When receiving the alarm information sent by the first sensing unit and/or the energy storage system controller, the fire suppression system controller indicates the fire extinguishing apparatus to perform a fire extinguishing operation.

20 Claims, 6 Drawing Sheets

<u>100</u>

(51) Int. Cl.

| | |
|---|---|
| *G08B 17/06* | (2006.01) |
| *G08B 17/10* | (2006.01) |
| *H01M 10/48* | (2006.01) |
| *H01M 50/383* | (2021.01) |

(52) U.S. Cl.
CPC ....... *H01M 10/482* (2013.01); *H01M 10/486* (2013.01); *H01M 50/383* (2021.01)

(56) References Cited

U.S. PATENT DOCUMENTS

| | | | | |
|---|---|---|---|---|
| 2022/0278417 A1* | 9/2022 | Lee | .................. | H01M 10/6567 |
| 2022/0320632 A1* | 10/2022 | Son | .................... | H01M 10/613 |
| 2024/0157181 A1* | 5/2024 | Moon | ...................... | A62C 3/16 |

FOREIGN PATENT DOCUMENTS

| | | | |
|---|---|---|---|
| CN | 112043993 A | 12/2020 | |
| CN | 113144492 A | 7/2021 | |
| CN | 113594565 A | 11/2021 | |

* cited by examiner

ENERGY STORAGE SYSTEM AND CONTROL METHOD THEREOF

CROSS-REFERENCE TO RELATED APPLICATION

This application claims priority to Chinese Application No. 202210317571.2, filed on Mar. 29, 2022, the disclosure of which is hereby incorporated by reference in its entirety.

TECHNICAL FIELD

Embodiments of this application relate to the energy field, and in particular, to an energy storage system and a control method thereof.

BACKGROUND

An existing energy storage system mainly includes a lithium battery system, a fire suppression system, an electrical system, and the like. The lithium battery system is configured to store energy, for example, the lithium battery system may include at least one battery for storing electric energy. The fire suppression system is used for fire detection and fire extinction for the energy storage system. The electrical system may include a power distribution unit, a power conversion unit, and the like.

At present, the fire suppression system in the existing energy storage system is usually an automatic fire extinguishing system suitable for common building fire suppression. The automatic fire extinguishing system includes a sensor, a fire suppression system controller, and a fire extinguishing device. The automatic fire extinguishing system detects a protected region by using the sensor (usually a smoke sensor and a temperature sensor), and outputs alarm information to the fire suppression system controller after detecting an anomaly. After receiving the alarm information, the fire suppression system controller may indicate the fire extinguishing device (for example, a cylinder filled with a fire extinguishing medium) to perform a fire extinguishing action. However, because the energy storage system includes the lithium battery system, if a fire is caused by thermal runaway of a battery in the lithium battery system, a fire development degree of the fire is more rapid than that of another electrical fire. However, in a manner in which the existing fire suppression system detects a fire by using the smoke sensor and the temperature sensor, when the fire is detected, an optimal extinguishing occasion may have been missed. Consequently, the fire develops to be difficult to control, and fire extinguishing difficulty is increased.

SUMMARY

This application provides an energy storage system and a control method thereof, so that thermal runaway of the energy storage system can be detected in time and a corresponding suppression measure can be performed.

According to a first aspect, an embodiment of this application provides an energy storage system. The energy storage system includes a first sensing unit, a second sensing unit, an energy storage system controller, a fire suppression system controller, a fire extinguishing apparatus, and an energy storage unit. The first sensing unit includes a temperature sensor and a smoke sensor. The temperature sensor is configured to detect a temperature value of the energy storage system. If detecting that the temperature value exceeds a first temperature threshold, the temperature sensor sends first alarm information to the fire suppression system controller. The smoke sensor is configured to detect a smoke concentration value of the energy storage system. If detecting that the smoke concentration value exceeds a smoke concentration threshold, the smoke sensor sends second alarm information to the fire suppression system controller. The second sensing unit is configured to: detect a first thermal runaway parameter of the energy storage system, and send the detected first thermal runaway parameter to the energy storage system controller. The first thermal runaway parameter includes at least one of the following: a first flammable gas concentration of the energy storage system, a first temperature value of the energy storage unit, and a first voltage value of the energy storage unit. The energy storage system controller is configured to: receive the first thermal runaway parameter output by the second sensing unit, and detect whether the first thermal runaway parameter meets a thermal runaway condition. When detecting that the first thermal runaway parameter meets a thermal runaway condition, the energy storage system controller sends third alarm information to the fire suppression system controller. In addition, the energy storage system controller controls the energy storage unit to stop energy charging or energy supply. The fire suppression system controller is configured to: when receiving at least one of the first alarm information, the second alarm information, and the third alarm information, indicate the fire extinguishing apparatus to perform a fire extinguishing operation. In this way, the energy storage system controller and the fire suppression system controller are two independent controllers. The energy storage system controller may determine, based on a thermal runaway parameter corresponding to the energy storage system, whether thermal runaway occurs, and control energy charging and energy supply of the energy storage system. The fire suppression system controller may determine, based on the received alarm information, whether to perform fire extinction, and control a fire extinguishing related operation. In other words, the independent energy storage system controller and the fire suppression system controller may execute their own determining logics and execute corresponding suppression operations respectively. The fire suppression system controller does not need to detect the thermal runaway parameter of the energy storage system and does not need to determine thermal runaway, so that reliability of the fire suppression system controller in the energy storage system can be effectively improved. In addition, in this embodiment of this application, the second sensing unit monitors the thermal runaway parameter in the energy storage system, so that the energy storage system controller can determine in time, based on the thermal runaway parameter, that thermal runaway occurs, and perform a corresponding suppression operation, to effectively improve thermal runaway detection efficiency and precision, and reduce a fire extinguishing difficulty, thereby improving a safety coefficient of the energy storage system.

For example, the first alarm information is optionally temperature alarm information in this embodiment of this application. Optionally, the second alarm information is smoke alarm information in this embodiment of this application. Optionally, the third alarm information is thermal runaway alarm information in this embodiment of this application.

For example, the energy storage system may be a fire control system in this embodiment of this application. For example, the first sensing unit may be a sensing unit in a fire detection and extinguishing system in this embodiment of this application. For example, the second sensing unit may be a sensing unit of the energy storage system part in the fire control system in this embodiment of this application. In other words, in this embodiment of this application, the fire control system may be understood as a large energy storage system, and the energy storage system further includes the fire suppression system controller, and the associated sensing unit and fire extinguishing apparatus, the energy storage system controller and the associated energy storage unit and sensing unit, and the like.

For example, a manner of communication between the flammable gas concentration sensor and the energy storage system controller is the same as or different from a manner of communication between the energy storage unit temperature sensor and the energy storage system controller. For example, the foregoing communication manner may be any one of the following: a ModBus protocol and a controller area network (CAN) protocol.

For example, the fire suppression system controller communicates with the energy storage system controller by using a dry contact. The fire suppression system controller communicates with the temperature sensor and the smoke sensor in the first sensing unit by using a two-wire system.

According to the first aspect, the second sensing unit includes at least one of a flammable gas sensor, an energy storage unit temperature sensor, and an energy storage unit voltage sensor. The flammable gas sensor is configured to: detect a flammable gas concentration of the energy storage system, and transmit the detected flammable gas concentration to the energy storage system controller. The energy storage unit temperature sensor is configured to: detect a temperature value of the energy storage unit, and transmit the detected temperature value to the energy storage system controller. The energy storage unit voltage sensor is configured to: detect a voltage value of the energy storage unit, and transmit the detected voltage value to the energy storage system controller. In this way, the energy storage system may detect, separately by using the flammable gas concentration sensor, the temperature sensor, and the voltage sensor, the thermal runaway parameter that may cause thermal runaway in the energy storage system. The sensors are connected to the energy storage control unit, so that the energy storage control unit can perform thermal runaway determining on a detection result, to implement independence between the energy storage system and a fire system.

According to the first aspect, or any implementation of the first aspect, the thermal runaway condition includes at least one of the following: a temperature value rise rate of the energy storage unit is greater than a temperature rise rate threshold; the temperature value of the energy storage unit is greater than a second temperature threshold; the voltage value of the energy storage unit is less than a voltage threshold; and the flammable gas concentration is greater than a first flammable gas concentration threshold. In this way, the energy storage system controller may determine, based on the preset thermal runaway condition, whether thermal runaway occurs, to locate, in time, thermal runaway that may occur in the energy storage system, thereby improving accuracy of thermal runaway detection and reducing a fire risk caused by thermal runaway.

According to the first aspect, or any implementation of the first aspect, the energy storage system further includes an interface module, the interface module is electrically connected to the energy storage system controller and the fire suppression system controller, and the interface module is configured to: receive the third alarm information output by the energy storage system controller, and transmit the third alarm information to the fire suppression system controller.

In this way, the energy storage system controller and the fire suppression system controller may exchange information by using the interface module, to avoid a safety problem of the fire suppression system controller caused by direct access of the energy storage system controller to the fire suppression system controller.

According to the first aspect, or any implementation of the first aspect, the fire suppression system controller is configured to: when the first alarm information and the second alarm information are received, and the third alarm information is not received, send fourth alarm information to the energy storage system controller, and indicate the fire extinguishing apparatus to perform the fire extinguishing operation. The energy storage system controller is further configured to: in response to the fourth alarm information, stop energy charging or energy supply of the energy storage unit. In this way, when detecting that a fire occurs, the fire suppression system controller may indicate the energy storage system controller to perform a corresponding thermal runaway suppression operation, to avoid burning and explosion of the energy storage unit of the energy storage system, thereby further reducing a fire extinguishing difficulty.

According to the first aspect, or any implementation of the first aspect, the energy storage unit includes n batteries; and the second sensing unit includes m flammable gas concentration sensors, p energy storage unit voltage sensors, and q energy storage unit temperature sensors, where m, p, and q are all positive integers greater than or equal to n. Each of then batteries corresponds to at least one energy storage unit temperature sensor, and a single energy storage unit temperature sensor is configured to detect a surface temperature of a corresponding battery. Each of the n batteries corresponds to at least one energy storage unit voltage sensor, and a single energy storage unit voltage sensor is configured to detect a voltage of a corresponding battery. Each of the n batteries corresponds to at least one flammable gas concentration sensor, and a single flammable gas concentration sensor is configured to detect a flammable gas concentration near a corresponding battery. In this way, the energy storage system can obtain a state of a single battery in time, to improve accuracy of thermal runaway determining.

According to the first aspect, or any implementation of the first aspect, thermal runaway includes first thermal runaway and second thermal runaway, the thermal runaway condition indicates that the first thermal runaway occurs, and a thermal runaway degree of the first thermal runaway is higher than a thermal runaway degree of the second thermal runaway.

According to the first aspect, or any implementation of the first aspect, the second sensing unit is further configured to: detect a second thermal runaway parameter of the energy storage system, and send the second thermal runaway parameter to the energy storage system controller. The second thermal runaway parameter includes at least one of the following: a second flammable gas concentration of the energy storage system, a second temperature value of the energy storage unit, and a second voltage value of the energy storage unit. The energy storage system controller is further configured to: when detecting that the second thermal runaway parameter meets a second thermal runaway condition, start an exhaust system of the energy storage system, and/or stop energy charging or energy supply of a battery on which the second thermal runaway occurs in the n batteries, where the second thermal runaway condition indicates that the second thermal runaway occurs. In this way, at least one sensor is disposed for each battery, so that a working state of the battery can be detected in time, thereby improving accuracy of thermal runaway determining.

For example, the battery may be a single battery, or may be a battery pack, or may be a battery string including a plurality of battery packs. This is not limited in this application.

According to the first aspect, or any implementation of the first aspect, the second thermal runaway condition includes at least one of the following: a surface temperature that is of a battery and that is detected by at least one of the q temperature sensors is greater than a third temperature threshold, and a flammable gas concentration detected by any of the m flammable gas concentration sensors is greater than a second flammable gas concentration threshold; and flammable gas concentrations detected by at least two of the m flammable gas concentration sensors are greater than a third flammable gas concentration threshold, where the second flammable gas concentration threshold is less than or equal to the third flammable gas concentration threshold. In this way, the fire suppression system controller may perform determining based on the preset second thermal runaway condition, to detect whether early thermal runaway occurs, so as to perform a thermal runaway suppression operation in an early thermal runaway phase, to further reduce a fire risk caused by thermal runaway of the energy storage system, and effectively improve reliability and safety of the energy storage system.

According to the first aspect, or any implementation of the first aspect, the fire extinguishing apparatus is configured to perform the fire extinguishing operation in response to an indication of the fire suppression system controller.

According to the first aspect, or any implementation of the first aspect, the fire extinguishing apparatus includes at least one of a fire gas cylinder filled with a fire extinguishing medium, an audible and visual alarm apparatus, and a gas release indicator; and the fire extinguishing operation performed by the fire extinguishing apparatus includes at least one of the following: spraying the fire extinguishing medium by using the fire gas cylinder; issuing an alarm by using the audible and visual alarm apparatus; and performing luminous indication by the gas release indicator.

According to a second aspect, an embodiment of this application provides a method for controlling an energy storage system. The energy storage system includes a first sensing unit, a second sensing unit, an energy storage system controller, a fire suppression system controller, a fire extinguishing apparatus, and an energy storage unit. The first sensing unit includes a temperature sensor and a smoke sensor. The method includes: The temperature sensor detects a temperature value of the energy storage system, and after detecting that the temperature value exceeds a first temperature threshold, sends first alarm information to the fire suppression system controller; the smoke sensor detects a smoke concentration value of the energy storage system, and after detecting that the smoke concentration value exceeds a smoke concentration threshold, sends second alarm information to the fire suppression system controller; the second sensing unit detects a first thermal runaway parameter of the energy storage system, and sends the first thermal runaway parameter to the energy storage system controller, where the first thermal runaway parameter includes at least one of the following: a first flammable gas concentration of the energy storage system, a first temperature value of the energy storage unit, and a first voltage value of the energy storage unit; when detecting that the first thermal runaway parameter meets a thermal runaway condition, the energy storage system controller sends third alarm information to the fire suppression system controller, and stops energy charging or energy supply of the energy storage unit; and when receiving at least one of the first alarm information, the second alarm information, and the third alarm information, the fire suppression system controller indicates the fire extinguishing apparatus to perform a fire extinguishing operation.

According to the second aspect, the second sensing unit includes at least one of a flammable gas sensor, an energy storage unit temperature sensor, and an energy storage unit voltage sensor; and that the second sensing unit detects a first thermal runaway parameter of the energy storage system includes: The flammable gas sensor detects a flammable gas concentration of the energy storage system, and transmits the detected first flammable gas concentration to the fire suppression system controller; the energy storage unit temperature sensor detects a temperature value of the energy storage unit, and transmits the detected first temperature value to the energy storage system controller; and the energy storage unit voltage sensor detects a voltage value of the energy storage unit, and transmits the detected first voltage value to the energy storage system controller.

According to the second aspect, or any implementation of the second aspect, the thermal runaway condition includes at least one of the following: a temperature value rise rate of the energy storage unit is greater than a temperature rise rate threshold; the temperature value of the energy storage unit is greater than a second temperature threshold; the voltage value of the energy storage unit is less than a voltage threshold; and the flammable gas concentration is greater than a first flammable gas concentration threshold.

According to the second aspect, or any implementation of the second aspect, the energy storage system further includes an interface module, the interface module is electrically connected to the energy storage system controller and the fire suppression system controller, and that the energy storage system controller sends third alarm information to the fire suppression system controller includes: The interface module receives the third alarm information output by the energy storage system controller, and transmits the third alarm information to the fire suppression system controller.

According to the second aspect, or any implementation of the second aspect, that when receiving at least one of the first alarm information, the second alarm information, and the third alarm information, the fire suppression system controller indicates the fire extinguishing apparatus to perform a fire extinguishing operation includes: When the first alarm information and the second alarm information are received, and the third alarm information is not received, the fire suppression system controller sends fourth alarm information to the energy storage system controller, and indicates the fire extinguishing apparatus to perform the fire extinguishing operation; and in response to the fourth alarm information, the energy storage system controller stops energy charging or energy supply of the energy storage unit.

According to the second aspect, or any implementation of the second aspect, the energy storage unit includes n batteries; and the second sensing unit includes m flammable gas concentration sensors, p energy storage unit voltage sensors, and q energy storage unit temperature sensors, where m, p, and q are all positive integers greater than or equal to n; each of the n batteries corresponds to at least one energy storage unit temperature sensor, and a single energy storage unit temperature sensor is configured to detect a surface temperature of a corresponding battery; each of the n batteries corresponds to at least one energy storage unit voltage sensor, and a single energy storage unit voltage sensor is configured to detect a voltage of a corresponding battery; and each of the n batteries corresponds to at least one flammable gas concentration sensor, and a single flammable gas concentration sensor is configured to detect a flammable gas concentration near a corresponding battery.

According to the second aspect, or any implementation of the second aspect, thermal runaway includes first thermal runaway and second thermal runaway, the thermal runaway condition indicates that the first thermal runaway occurs, and a thermal runaway degree of the first thermal runaway is higher than a thermal runaway degree of the second thermal runaway.

According to the second aspect, or any implementation of the second aspect, the method further includes: The second sensing unit detects a second thermal runaway parameter of the energy storage system, and sends the second thermal runaway parameter to the energy storage system controller, where the second thermal runaway parameter includes at least one of the following: a second flammable gas concentration of the energy storage system, a second temperature value of the energy storage unit, and a second voltage value of the energy storage unit; and when detecting that the second thermal runaway parameter meets a second thermal runaway condition, the energy storage system controller starts an exhaust system of the energy storage system, and/or stops energy charging or energy supply of a battery on which the second thermal runaway occurs in the n batteries, where the second thermal runaway condition indicates that the second thermal runaway occurs.

According to the second aspect, or any implementation of the second aspect, the second thermal runaway condition includes at least one of the following: a surface temperature that is of a battery and that is detected by at least one of the q temperature sensors is greater than a third temperature threshold, and a flammable gas concentration detected by any of the m flammable gas concentration sensors is greater than a second flammable gas concentration threshold; and flammable gas concentrations detected by at least two of the m flammable gas concentration sensors are greater than a third flammable gas concentration threshold, where the second flammable gas concentration threshold is less than or equal to the third flammable gas concentration threshold.

According to the second aspect, or any implementation of the second aspect, the fire extinguishing apparatus is configured to perform the fire extinguishing operation in response to an indication of the fire suppression system controller.

According to the second aspect, or any implementation of the second aspect, the fire extinguishing apparatus includes at least one of a fire gas cylinder filled with a fire extinguishing medium, an audible and visual alarm apparatus, and a gas release indicator; and the fire extinguishing operation performed by the fire extinguishing apparatus includes at least one of the following: spraying the fire extinguishing medium by using the fire gas cylinder; issuing an alarm by using the audible and visual alarm apparatus; and performing luminous indication by the gas release indicator.

The second aspect and any implementation of the second aspect respectively correspond to the first aspect and any implementation of the first aspect. For technical effect corresponding to the second aspect and any implementation of the second aspect, refer to the technical effect corresponding to the first aspect and any implementation of the first aspect. Details are not described herein again.

According to a third aspect, an embodiment of this application provides a computer-readable medium, configured to store a computer program. The computer program includes instructions for performing the method in the first aspect or any possible implementation of the first aspect.

According to a fourth aspect, an embodiment of this application provides a computer program. The computer program includes instructions for performing the method in the first aspect or any possible implementation of the first aspect.

According to a fifth aspect, an embodiment of this application provides a chip. The chip includes a processing circuit and a transceiver pin. The transceiver pin and the processing circuit communicate with each other by using an internal connection path. The processing circuit performs the method in the first aspect or any possible implementation of the first aspect, to control a receive pin to receive a signal and a transmit pin to send a signal.

DESCRIPTION OF EMBODIMENTS

The following clearly describes technical solutions in embodiments of this application with reference to the accompanying drawings. It will be appreciated that the described embodiments are some rather than all of embodiments of this application. Other embodiments obtained by a person of ordinary skill in the art based on embodiments of this application without creative efforts may fall within the protection scope of this application.

Figure 1:
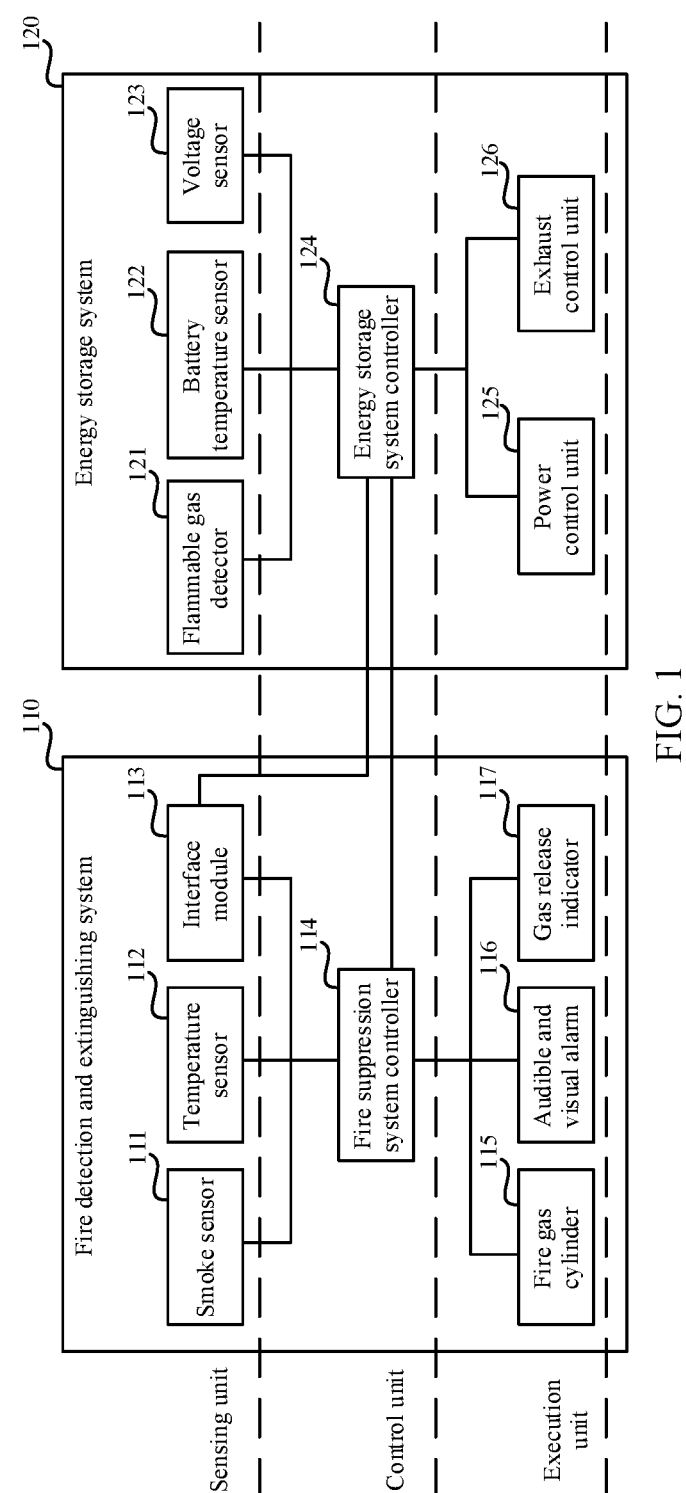
FIG. 1 is a schematic diagram of a structure of an example of a fire control system.

FIG. 1 is a schematic diagram of a structure of a fire control system 100 according to an embodiment of this application. It should be understood that the system architecture shown in FIG. 1 is merely an example, and the fire control system may have more or fewer devices or modules than those shown in FIG. 1.

The fire control system 100 may include a fire detection and extinguishing system 110 (which may also be referred to as a fire sensing and extinguishing system, a fire extinguishing system, a fire suppression system, or the like, and is not limited in this application) and an energy storage system 120. It should be noted that in this embodiment of this application, the fire control system may also be understood as an energy storage system. The energy storage system includes the fire detection and extinguishing system 110 and modules or apparatuses in the energy storage system 120. This is not limited in this application.

For example, both the fire detection and extinguishing system 110 and the energy storage system 120 include a sensing unit, a control unit, and an execution unit.

With reference to FIG. 1, the sensing unit of the fire detection and extinguishing system 110 includes but is not limited to: a smoke sensor 111, a temperature sensor 112, and an interface module 113. The control unit of the fire detection and extinguishing system 110 includes a fire suppression system controller 114 (which may also be referred to as a fire controller, a fire control unit, or a fire control module, and is not limited in this application). The execution unit of the fire detection and extinguishing system 110 includes but is not limited to apparatuses such as a fire gas cylinder 115, an audible and visual alarm 116, and a gas release indicator 117.

The sensing unit of the energy storage system 120 includes but is not limited to: a flammable gas detector 121, a battery temperature sensor 122, and a voltage sensor 123. The control unit of the energy storage system 120 includes but is not limited to an energy storage system controller 124. The execution unit of the energy storage system includes but is not limited to a power control unit 125 and an exhaust control unit 126. The energy storage system 120 further includes but not limited to an energy storage unit, an electrical system, and the like. Optionally, the energy storage unit includes one or N energy storage units, where N is a positive integer greater than 1. The energy storage unit may be configured to store or release energy. This may also be understood as energy charging or energy supply. In this embodiment of this application, an example in which a single energy storage unit is a lithium battery energy storage device (which may also be referred to as a lithium battery, and is referred to as a battery for short in this application) pack (hereinafter referred to as a battery pack) is used for description. The battery pack includes a plurality of batteries. Certainly, in another embodiment, the single energy storage unit may also be a single battery, or a battery string including a plurality of battery packs. In addition, in another embodiment, the energy storage unit may alternatively be a hydrogen energy storage device, a lead-acid energy storage device, or the like. This is not limited in this application.

The smoke sensor 111 is electrically connected to the fire suppression system controller 114, and the smoke sensor 111 is configured to sense (or detect) a smoke concentration in a space in which the system is located. A smoke concentration threshold may be set for the smoke sensor 111, and the smoke concentration threshold indicates the smoke sensor 111 to report smoke alarm information to the fire suppression system controller. After detecting that the smoke concentration in the space is greater than or equal to the smoke concentration threshold, the smoke sensor 111 outputs the smoke alarm information to the fire suppression system controller. The fire detection and extinguishing system 110 may include one or N smoke sensors 111, where N is a positive integer greater than 1. The N smoke sensors 111 may be distributed in each area in the space. A specific distribution manner may be set based on an actual requirement. This is not limited in this application.

The temperature sensor 112 is electrically connected to the fire suppression system controller 114, and the temperature sensor 112 is configured to sense a temperature in a space in which the system is located. A temperature threshold A may be set for the temperature sensor 112, and the temperature threshold A indicates the temperature sensor 112 to report temperature alarm information to the fire suppression system controller. After detecting that the temperature in the space is greater than or equal to the temperature threshold A, the temperature sensor 112 outputs the temperature alarm information to the fire suppression system controller. The fire detection and extinguishing system 110 may include one or N temperature sensors 112, where N is a positive integer greater than 1. The N temperature sensors 112 may be distributed in each area in the space. A specific distribution manner may be set based on an actual requirement. This is not limited in this application.

The interface module 113 is electrically connected to the fire suppression system controller 114, and the interface module 113 is configured to: receive fierce thermal runaway alarm information input by the energy storage system controller 124, and output the fierce thermal runaway alarm information to the fire suppression system controller 114. For example, the interface module 113 may further include a plurality of other interfaces, for accessing another system.

Types of connection (which may also be understood as types of communication) between the fire suppression system controller 114 and the modules in the sensing unit are the same or different. Optionally, the fire suppression system controller 114 communicates with the smoke sensor 111 and the temperature sensor 112 separately based on a two-wire system. The fire suppression system controller 114 communicates with the interface module 113 based on a dry contact.

A fire extinguishing condition may be set for the fire suppression system controller 114, and the fire extinguishing condition indicates the fire suppression system controller 114 to control the execution unit to perform a fire extinguishing operation, and indicates the fire suppression system controller 114 to notify the energy storage system controller 124 to perform a thermal runaway control operation. For example, after detecting, based on alarm information (including the smoke alarm information, the temperature alarm information, and/or the thermal runaway alarm information) input by the smoke sensor 111, the temperature sensor 112, and/or the interface module 113, that the fire extinguishing condition is met, the fire suppression system controller 114 outputs fire alarm information to the energy storage system controller 124, and indicates the execution unit of the fire detection and extinguishing system 110 to perform a fire extinguishing operation. For example, the fire suppression system controller 114 is electrically connected to the energy storage system controller 124, and may perform communication based on a dry contact.

The fire gas cylinder 115 is electrically connected to the fire suppression system controller 114, and the fire gas cylinder 115 may be filled with a fire extinguishing medium. Optionally, the fire extinguishing medium includes but is not limited to at least one of the following: heptafluoropropane, perfluorohexane, water, and an inert gas. The fire gas cylinder 115 may perform a fire extinguishing operation, for example, spray the fire extinguishing medium in response to an indication of the fire suppression system controller 114. The fire detection and extinguishing system 110 may include one or N fire gas cylinders 115. The fire suppression system controller 114 may indicate at least one fire gas cylinder 115 to perform a fire extinguishing operation. The N fire gas cylinders 115 may be loaded with fire extinguishing media of a same type or different types. This is not limited in this application.

The audible and visual alarm 116 is electrically connected to the fire suppression system controller 114, and may be configured to perform audible and visual alarming, for example, play an alarm bell and/or flash a caution light in response to an indication of the fire suppression system controller 114.

The gas release indicator 117 is electrically connected to the fire suppression system controller 114, and is used for lighting up (which may also be a flashing prompt, and is not limited in this application) in response to the fire suppression system controller 114, to indicate that the fire execution unit is performing a fire extinguishing operation, and the gas release indicator 117 may be configured to indicate that the fire gas cylinder is spraying a fire extinguishing medium.

Types of connection between the fire suppression system controller 114 and the devices or modules in the execution unit are the same or different. Optionally, the fire suppression system controller 114 communicates with the fire gas cylinder 115, the audible and visual alarm 116, and the gas release indicator 117 based on a two-wire system. For example, the fire suppression system controller 114 is connected to the fire gas cylinder 115, the audible and visual alarm 116, and the gas release indicator 117 by using a two-wire bus.

The flammable gas detector 121 is electrically connected to the energy storage system controller 124, and the flammable gas detector 121 is configured to sense a flammable gas concentration in a space. The flammable gas detector 121 outputs the detected flammable gas concentration to the energy storage system controller 124. Optionally, the flammable gas detector 121 may periodically output a flammable gas concentration detection result to the energy storage system controller 124 based on a sampling period. The sampling period of the flammable gas detector 121 may be set based on an actual requirement. For example, in this embodiment of this application, sampling periods of the flammable gas detector 121 and other sensors (including the battery temperature sensor, the voltage sensor, and the like) may be at a millisecond level. Optionally, the flammable gas detector 121 may include one or N flammable gas detectors. A type of the flammable gas detector 121 may be a carbon monoxide detector, a hydrogen gas detector, a methane detector, a detector of a plurality of compound gases, an electrolyte volatile detector, or the like. Optionally, types of the N flammable gas detectors 121 may be the same or may be different. This is not limited in this application. For example, as described above, the energy storage system 120 includes the energy storage unit, and the energy storage unit may include one or N batteries (which may be a single battery, or may be a battery pack or a battery string, and this is not limited in this application). Each battery may correspond to at least one flammable gas detector 121. The flammable gas detector 121 may be attached on a surface of the battery, or may be disposed near the battery. This is not limited in this application. Optionally, in addition to being disposed on the surface of the battery or near the battery, the flammable gas detector 121 may be further disposed above a space in which the energy storage system is located.

The battery temperature sensor 122 (which may also be referred to as an energy storage device temperature sensor) is electrically connected to the energy storage system controller 124. The energy storage system 120 may include one or N battery temperature sensors 122. At least one battery temperature sensor 122 may be disposed on a surface of each battery. The battery temperature sensor 122 may be configured to: detect a battery surface temperature of a corresponding battery, and output the detected temperature to the energy storage system controller 124. Optionally, the battery temperature sensor 122 may be a thermocouple, an NTC (negative temperature coefficient) thermistor, or the like.

The voltage sensor 123 is electrically connected to the energy storage system controller 124. For example, the energy storage system 120 may include one or N voltage sensors 123. Optionally, each battery may be provided with at least one voltage sensor 123. The voltage sensor 123 may be configured to: detect a voltage of a corresponding battery, and output the detected voltage to the energy storage system controller 124.

Types of communication between the energy storage system controller 124 and the modules in the sensing unit are the same or different. For example, the energy storage system controller 124 may communicate with the flammable gas detector 121 and the energy storage system controller 124 may communicate with the battery temperature sensor based on a ModBus (for example, may communicate based on an RS-485 bus), or communicate based on a CAN (controller area network) protocol. In another embodiment, communication may also be performed based on another communication manner. This is not limited in this application.

A fierce thermal runaway condition is set for the energy storage system controller 124, and the fierce thermal runaway condition indicates the energy storage system controller 124 to perform a fierce thermal runaway control operation. For example, the energy storage system controller 124 receives thermal runaway parameters input by the flammable gas detector 121, the battery temperature sensor 122, and the voltage sensor 123, to determine whether the fierce thermal runaway condition is met. In an example, if the energy storage system controller 124 determines that the fierce thermal runaway condition is met, the energy storage system controller 124 performs a fierce thermal runaway control operation. The fierce thermal runaway control operation includes but is not limited to: outputting, by the energy storage system controller 124, fierce thermal runaway alarm information to the interface module 113, and indicating, by the energy storage system controller 124, the execution unit to perform a fierce thermal runaway suppression operation. For example, the energy storage system controller 124 sends the fierce thermal runaway alarm information to the interface module 113, to trigger the interface module 113 to issue an alarm to the fire suppression system controller 114. That is, after receiving the fierce thermal runaway alarm information, the interface module 113 outputs the fierce thermal runaway alarm information to the fire suppression system controller 114. In another example, if the energy storage system controller 124 determines that the fierce thermal runaway condition is not met, detection is continued. A specific implementation is described in detail in the following embodiments. For example, the thermal runaway parameter described in this specification may also be referred to as a thermal runaway detection parameter, a thermal runaway condition determining parameter, or the like. This is not limited in this application. The thermal runaway parameter includes a flammable gas concentration parameter detected by the flammable gas detector 121, a battery surface temperature parameter detected by the battery temperature sensor, and a battery voltage parameter detected by the voltage sensor.

Optionally, an early thermal runaway condition may be further set for the energy storage system controller 124, and the early thermal runaway condition indicates the energy storage system controller 124 to perform an early thermal runaway control operation. In an example, if the energy storage system controller 124 determines that the early thermal runaway condition is met, the early thermal runaway control operation is performed. The early thermal runaway control operation includes indicating, by the energy storage system controller 124, the execution unit to perform an early thermal runaway suppression operation. In another example, if the energy storage system controller 124 determines that the early thermal runaway condition is not met, detection is continued. In this embodiment of this application, an intensity degree of early thermal runaway is lower than a degree of fierce thermal runaway. Correspondingly, the early thermal runaway condition corresponding to the early thermal runaway is looser than the fierce thermal runaway condition corresponding to the fierce thermal runaway, or it may be understood that, a limited range of the early thermal runaway condition is smaller than a limited range of the fierce thermal runaway condition. Correspondingly, the early thermal runaway control operation is different from the fierce thermal runaway control operation, and it may also be understood that, a processing manner of the early thermal runaway control operation is more moderated than a processing manner of the fierce thermal runaway control operation. A specific example is described in detail in the following embodiments.

The power control unit 125 is electrically connected to the energy storage system controller 124. The power control unit is configured to perform a thermal runaway suppression operation (including the early thermal runaway suppression operation and the fierce thermal runaway suppression operation) in response to an indication of the energy storage system controller 124. For example, the power control unit 125 may control to cut off energy charging and energy supply of all or some batteries.

The exhaust control unit 126 is electrically connected to the energy storage system controller 124. The exhaust control unit 126 is configured to perform a thermal runaway suppression operation (including the early thermal runaway suppression operation and the fierce thermal runaway suppression operation) in response to an indication of the energy storage system controller 124. For example, the exhaust control unit 126 starts an exhaust fan, a ventilation shutter, and/or a ventilation valve.

The energy storage system controller 124 is electrically connected to the power control unit 125 and the exhaust control unit 126 separately, and connection types are the same or different. For example, the energy storage system controller 124 communicates with the power control unit 125 based on the RS-485 bus, and the energy storage system controller 124 communicates with the exhaust control unit 126 based on the RS-485 bus. This is not limited in this application. It should be noted that the communication manners described in this embodiment of this application are merely examples. In another embodiment, communication may also be performed in another feasible communication manner. For example, the energy storage system controller 124 may communicate with another device based on fast Ethernet (FE). This is not limited in this application.

Figures 2A, 2B:
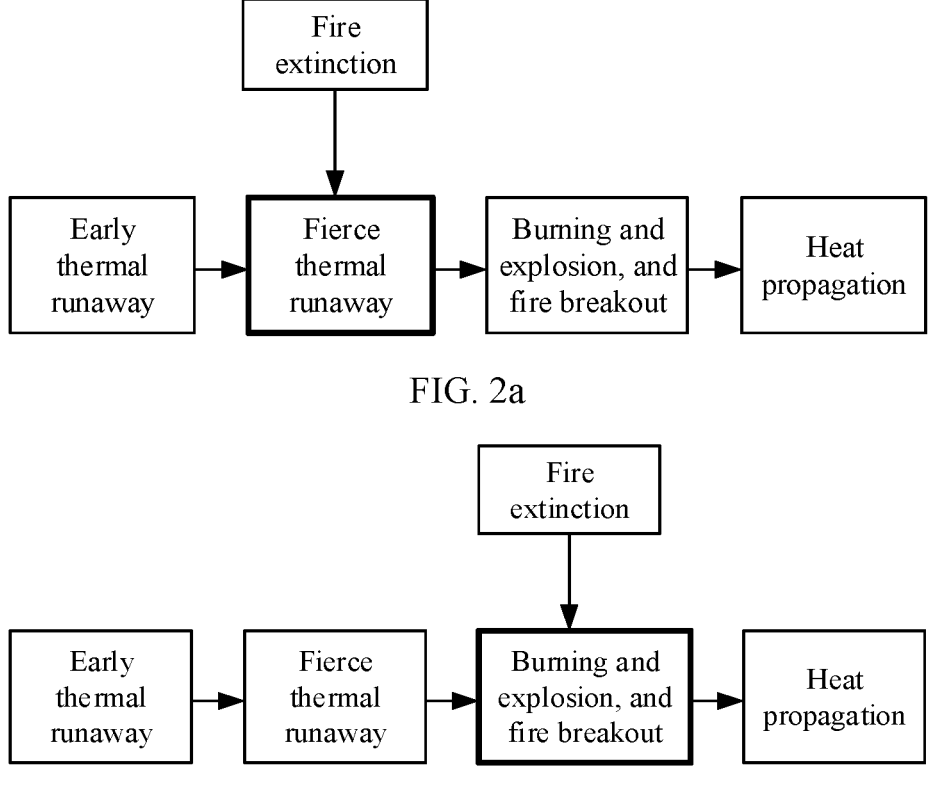
FIG. 2a and FIG. 2b are schematic diagrams of examples of thermal runaway phases.

As shown in FIG. 2a, a fire caused by thermal runaway of the energy storage system may be divided into at least four phases, including but not limited to: an early thermal runaway phase-a fierce thermal runaway phase-a burning and explosion and fire breakout phase-a heat propagation phase. In this embodiment of this application, the energy storage system 120 in the fire control system 100 may accurately detect thermal runaway of the energy storage system, and when detecting fierce thermal runaway, the energy storage system performs a thermal runaway control operation. In other words, as shown in FIG. 2a, the fire control system in this embodiment of this application may intervene in the fierce thermal runaway phase, to suppress a fire caused by the thermal runaway in the fierce thermal runaway phase, thereby preventing dangers such as burning and explosion, fire breakout, and heat propagation caused by the thermal runaway. Compared with the conventional technology shown in FIG. 2b, an automatic fire extinguishing system for common building fire suppression performs fire extinction when detecting that smoke and/or a temperature exceed/exceeds a standard, that is, in a burning and explosion and fire breakout phase. The fire control system in this embodiment of this application can effectively reduce a fire risk in an application scenario of the energy storage system by using more accurate detection and a timely suppression policy, so as to avoid a property loss.

With reference to FIG. 1, the following describes in detail a fire control method in embodiments of this application by using specific embodiments.

Embodiment 1

Figure 3:
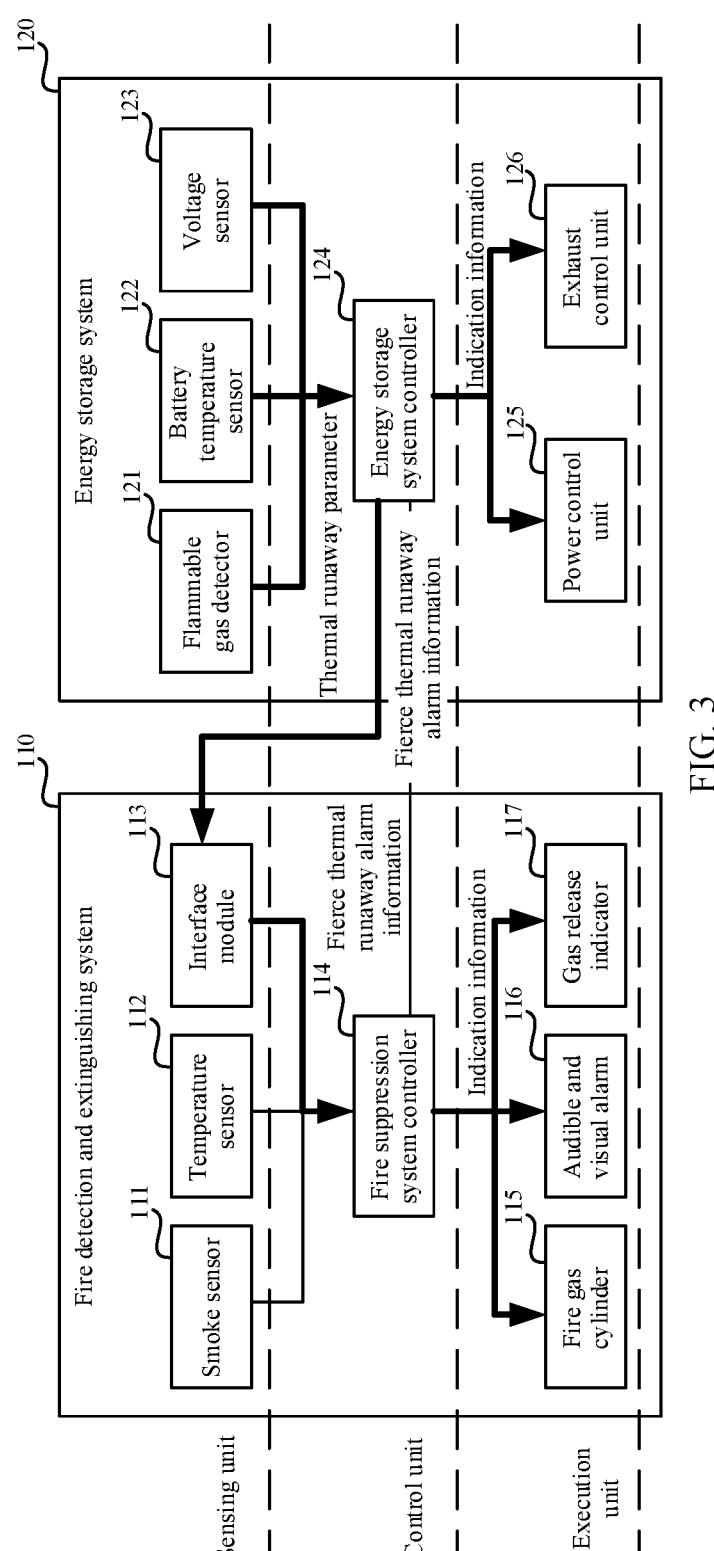
FIG. 3 is a schematic diagram of an example of module interaction in a fire control solution applied to a fierce thermal runaway scenario.

In this embodiment, a scenario in which thermal runaway occurs on a battery in the energy storage system is used as an example for description. FIG. 3 is a schematic diagram of an example of module interaction in a fire control solution applied to a fierce thermal runaway scenario. With reference to FIG. 3, the fire control method includes:

Each flammable gas detector 121 collects a flammable gas concentration in a space, and outputs the collected flammable gas concentration parameter to the energy storage system controller 124. Each battery temperature sensor 122 collects a battery surface temperature of a corresponding battery, and outputs the collected battery surface temperature parameter to the energy storage system controller 124. Each voltage sensor 123 collects a voltage of a corresponding battery, and outputs the collected voltage parameter to the energy storage system controller 124.

The energy storage system controller 124 receives the thermal runaway parameters input by the flammable gas detector 121, the battery temperature sensor 122, and the voltage sensor 123. The thermal runaway parameters include the flammable gas concentration parameter, the battery surface temperature parameter, and the voltage parameter.

The energy storage system controller 125 may determine, based on a preset fierce thermal runaway condition, whether fierce thermal runaway occurs. This embodiment of this application provides several optional fierce thermal runaway conditions:

First Fierce Thermal Runaway Condition:

(1) A rise rate of the battery surface temperature parameter detected by any battery temperature sensor 122 is greater than 1° C., and the battery temperature parameter detected by any battery temperature sensor 122 is greater than a maximum allowable battery working temperature threshold, and the flammable gas concentration parameter detected by any flammable gas detector 121 is greater than a flammable gas concentration threshold a.

(2) A rise rate of the battery surface temperature parameter detected by any battery temperature sensor 122 is greater than 1° C., and a fall (namely, decrease) amplitude of the voltage parameter detected by any voltage sensor 123 is greater than 25%, and the flammable gas concentration parameter detected by any flammable gas detector 121 is greater than a flammable gas concentration threshold a.

(3) Flammable gas concentration parameters detected by at least two flammable gas detectors 121 are greater than a flammable gas concentration threshold b. The flammable gas concentration threshold b is greater than the flammable gas concentration threshold a.

When detecting that the thermal runaway parameter meets any one of the conditions (1) to (3) in the first fierce thermal runaway condition, the energy storage system controller 124 may determine that the first fierce thermal runaway condition is met, that is, determine that fierce thermal runaway occurs.

Second Fierce Thermal Runaway Condition:

(1) A rise rate of the battery surface temperature parameter detected by any battery temperature sensor 122 is greater than 1° C.

(2) The battery temperature parameter detected by any battery temperature sensor 122 is greater than a maximum allowable battery working temperature threshold.

(3) Flammable gas concentration parameters detected by at least two flammable gas detectors 121 are greater than a flammable gas concentration threshold b.

(4) A fall (namely, decrease) amplitude of the voltage parameter detected by any voltage sensor 123 is greater than 25%.

When detecting that the thermal runaway parameter meets any one of the conditions (1) to (4) in the second fierce thermal runaway condition, the energy storage system controller 124 may determine that the second fierce thermal runaway condition is met, that is, determine that fierce thermal runaway occurs.

It should be noted that the thresholds in this embodiment of this application may be set based on an actual requirement. For example, the maximum allowable battery working temperature varies with types and models of used batteries. For another example, the flammable gas concentration threshold varies with types of detected flammable gases. This is not limited in this application.

It should be further noted that a larger quantity of parallel sub-conditions included in the fierce thermal runaway condition may indicate a reduced probability of misjudgment of the thermal runaway. However, if a smaller quantity of parallel sub-conditions are included in the fierce thermal runaway condition, thermal runaway pre-warning may be performed earlier. A condition for determining that fierce thermal runaway occurs may be set based on an actual requirement. The fierce thermal runaway condition in this application is merely an example, and may actually include more or fewer conditions. This is not limited in this application.

In this embodiment of this application, the first fierce thermal runaway condition is used as an example for description. For example, if the energy storage system controller determines, based on the received thermal runaway parameter, that the condition (1) in the first fierce thermal runaway condition is met, the energy storage system controller may determine that fierce thermal runaway occurs. In another example, if the energy storage system controller 124 determines that the first fierce thermal runaway condition is not met, that is, determines that no fierce thermal runaway occurs, the energy storage system controller 125 continues to monitor the thermal runaway parameters input by the sensing devices.

For example, after determining that fierce thermal runaway occurs, the energy storage system controller 124 sends fierce thermal runaway alarm information to the interface module 113. The fierce thermal runaway alarm information indicates that fierce thermal runaway occurs in the energy storage system. In addition, the energy storage system controller 124 sends indication information to the execution unit, to indicate the execution unit to perform a fierce thermal runaway suppression operation. For example, the energy storage system controller 124 may send indication information to the power control unit. The indication information indicates the power control unit to cut off energy charging and energy supply of all batteries in the energy storage system. In addition, the energy storage system controller 124 may send indication information to the exhaust control unit 126. The indication information indicates the exhaust control unit 126 to start an exhaust fan, a ventilation shutter, a ventilation valve, and/or the like.

In response to an indication of the energy storage system controller 124, the power control unit 125 cuts off energy charging and energy supply of all batteries. The exhaust control unit 126 may start an exhaust fan, a ventilation shutter, and/or a ventilation valve in response to an indication of the energy storage system controller 124.

Still refer to FIG. 3. For example, the interface module 113 receives the fierce thermal runaway alarm information input by the energy storage system controller 124, and the interface module 113 converts the fierce thermal runaway alarm information into a signal that complies with a communication protocol between the interface module 113 and the fire suppression system controller 114, and sends the signal to the fire suppression system controller 114. It may be understood that, the interface module 113 may implement a conversion function. After receiving the fierce thermal runaway alarm information input by the energy storage system controller 125, the interface module 113 converts a signal and outputs the signal to the fire suppression system controller 114. In this embodiment of this application, the interface module 113 may be understood as an alarm apparatus equivalent to the smoke sensor and the temperature sensor, and may input alarm information to the fire suppression system controller 114, to trigger the fire suppression system controller 114 to perform a fire suppression operation. It should be noted that the fire detection and extinguishing system 110 usually undergoes standard certification. If a connection manner or an interface of the fire detection and extinguishing system 110 is changed, standard certification needs to be performed on the fire detection and extinguishing system 110 again. In this embodiment of this application, the energy storage system is connected to the interface module 113, to issue an alarm to the fire suppression system controller by using the interface module 113, so that thermal runaway of the energy storage system can be monitored without changing a structure and a connection manner of the fire detection and extinguishing system 110.

Further, in this embodiment of this application, both the energy storage system 120 and the fire detection and extinguishing system 110 are independent systems. The energy storage system 120 is used as an independent system, and the energy storage system controller 124 of the energy storage system 120 may perform determining based on the received thermal runaway parameter, and trigger the interface module 113 to issue an alarm to the fire suppression system controller 114. In addition, the energy storage system 120 may further control the execution unit to perform a thermal runaway suppression operation. Correspondingly, the fire detection and extinguishing system 110 is used as an independent system, and the fire suppression system controller 114 of the fire detection and extinguishing system 110 is only configured to perform a fire detection and extinguishing operation, does not need to monitor the thermal runaway parameter of the energy storage system, and does not need to perform thermal runaway determining, so that reliability of the fire detection and extinguishing system can be effectively improved.

Still refer to FIG. 3. For example, in the fire detection and extinguishing system 110, the fire suppression system controller 114 receives the fierce thermal runaway alarm information input by the interface module 113. The fire suppression system controller 114 determines, based on a preset fire extinguishing condition, whether a fire extinguishing operation (which may also be understood as a fire suppression operation) needs to be performed.

It should be noted that FIG. 3 does not show that the smoke sensor 111 and the temperature sensor 112 keep a detection action, that is, the modules in the sensing unit in the fire detection and extinguishing system 110 do not interfere with each other. When the interface module 113 issues an alarm to the fire suppression system controller 114, if the smoke sensor 111 detects that a smoke concentration is greater than a smoke concentration threshold, and/or if the temperature sensor 112 detects that a temperature in a space is greater than the temperature threshold A, an alarm may also be issued to the fire suppression system controller 114.

In this embodiment of this application, the fire extinguishing condition may include:

(1) The fire suppression system controller 114 receives alarms from the smoke sensor 111 and the temperature sensor 112.

(2) The fire suppression system controller 114 receives an alarm from the interface module 113.

In another embodiment, the fire extinguishing condition may also include:

(1) The fire suppression system controller 114 receives alarms from the smoke sensor 111 and the interface module 113.

(2) The fire suppression system controller 114 receives alarms from the temperature sensor 112 and the interface module 113.

The sub-conditions in the fire extinguishing condition are in an "or" relationship. In other words, if any one of the conditions (1) and (2) of the fire extinguishing condition is met, the fire extinguishing condition is met.

The fire extinguishing condition in this embodiment of this application is only an example. In another embodiment, more or fewer conditions may be included. This is not limited in this application.

In an example, if the fire suppression system controller 114 determines that the fire extinguishing condition is met, a fire extinguishing operation may be performed. In another example, if the fire suppression system controller 114 determines that the fire extinguishing condition is not met, monitoring is continued.

In this embodiment of this application, an example in which the fire suppression system controller 114 receives the fierce thermal runaway alarm information input by the interface module 113 and determines that the fire extinguishing condition is met is used for description. After determining that the fire extinguishing condition is met, the fire suppression system controller 114 may send indication information to the execution unit, to indicate the execution unit to execute a corresponding fire extinguishing operation. For example, the fire suppression system controller 114 may separately send indication information to the fire gas cylinder 115, the audible and visual alarm 116, and the gas release indicator 117. The fire gas cylinder 115 sprays a fire extinguishing medium in response to an indication of the fire suppression system controller 114. The audible and visual alarm 116 plays an alarm bell and/or flashes a caution light in response to an indication of the fire suppression system controller 114. The gas release indicator 117 lights up in response to an indication of the fire suppression system controller 114.

Embodiment 2

Figure 4:
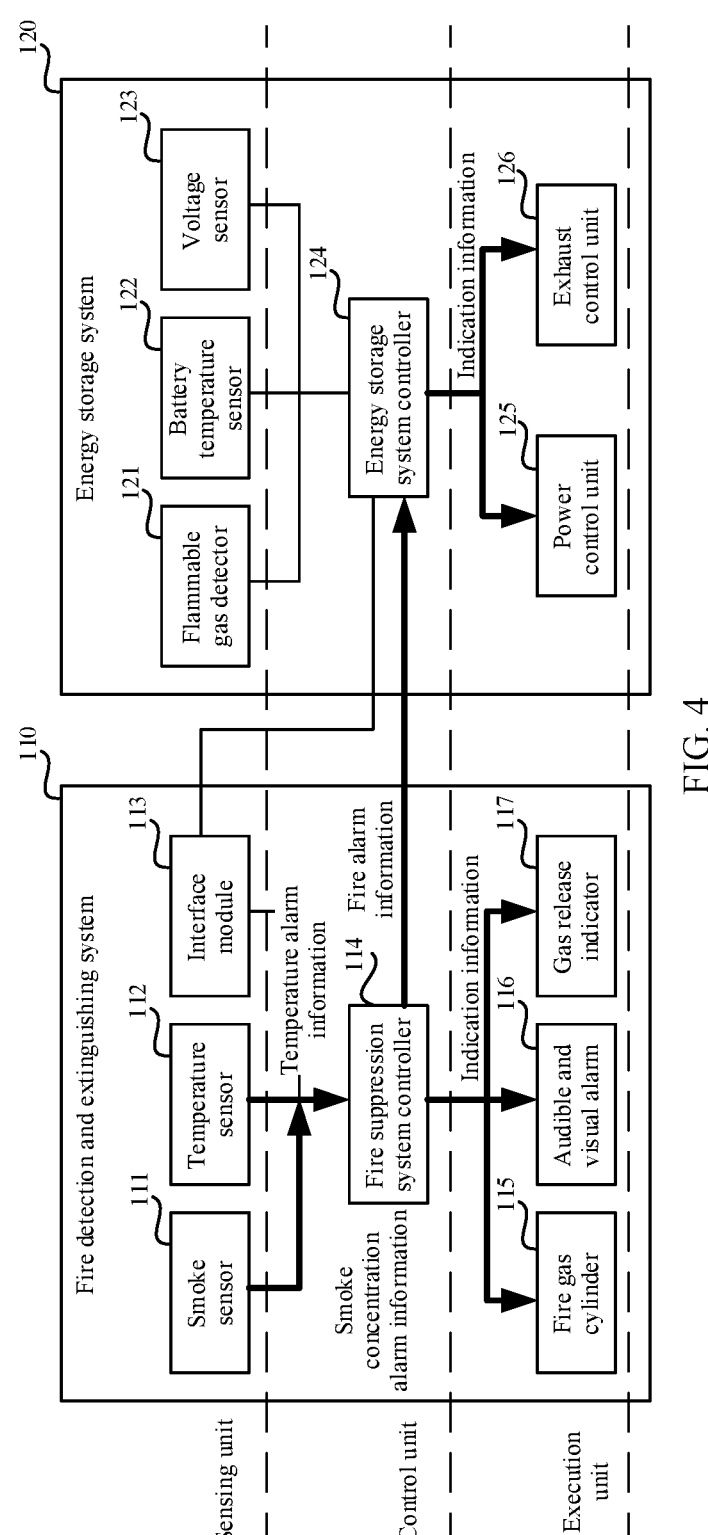
FIG. 4 is a schematic diagram of an example of module interaction.

In this embodiment, a scenario in which an electrical fire occurs is used as an example for description. FIG. 4 is a schematic diagram of an example of module interaction. With reference to FIG. 4, the fire control method includes:

For example, in a scenario in which an electrical fire occurs, the smoke sensor 111 detects that a smoke concentration is greater than a smoke concentration threshold, and the smoke sensor 111 outputs smoke concentration alarm information to the fire suppression system controller 114, to indicate that the smoke concentration exceeds a standard. The temperature sensor 112 detects that a temperature in a space is greater than the temperature threshold A, and the temperature sensor 112 outputs temperature alarm information to the fire suppression system controller 114, to indicate that the temperature in the space exceeds a standard.

The fire suppression system controller 114 receives alarm information of the smoke sensor 111 and the temperature sensor 112, and determines, based on the foregoing fire extinguishing condition, that the fire extinguishing condition is met. The fire suppression system controller 114 sends fire alarm information to the energy storage system controller, to trigger the energy storage system controller 124 to perform a thermal runaway suppression operation (refer to the foregoing fierce thermal runaway suppression operation, for example, cutting off energy charging and energy supply of the battery). In addition, the fire suppression system controller 114 indicates the execution unit to perform a fire extinguishing operation.

In response to the received fire alarm information, the energy storage system controller 124 determines that a fire occurs, and the energy storage system controller 124 may send indication information to the execution unit, to trigger each device of the execution unit to perform a corresponding thermal runaway suppression operation. Correspondingly, when an electrical fire occurs, the fire detection and extinguishing system performs a fire extinguishing operation, so that the energy storage system performs a thermal runaway suppression operation when the fire is extinguished, so that the fire can be effectively prevented from spreading to the energy storage system and causing a danger such as explosion to the energy storage system, thereby reducing an intensity degree of the fire.

Still refer to FIG. 4. For example, the execution unit in the fire detection and extinguishing system 110 performs a fire extinguishing operation in response to an indication of the fire suppression system controller 114, to quickly extinguish a fire and protect property safety.

It should be noted that other modules in FIG. 4 still perform corresponding actions in the manner described in FIG. 3. For example, the sensing unit in the energy storage system 120 detects and outputs the thermal runaway parameter to the energy storage system controller 124, and the energy storage system controller 124 determines, based on the received thermal runaway parameter and the fierce thermal runaway condition, whether thermal runaway occurs. For details not described, refer to related content in FIG. 3. Details are not described herein again.

In a possible implementation, if the fire suppression system controller 114 receives only alarm information input by the smoke sensor 111 or the temperature sensor 112, that is, the fire suppression system controller 114 determines, based on the input alarm information, that smoke in the space exceeds a standard or a temperature in the space exceeds a standard, the fire suppression system controller 114 may send fire pre-warning information to the energy storage system controller 124, to trigger the energy storage system controller 124 to perform a thermal runaway suppression operation. In response to the fire pre-warning information input by the fire suppression system controller 114, the energy storage system controller 124 may indicate the execution unit to perform a thermal runaway suppression operation. For specific details of the thermal runaway suppression operation, refer to the foregoing fierce thermal runaway operation, and details are not described herein again. In this way, when the temperature in the space is excessively high or the smoke concentration in the space is excessively high, the energy storage system may perform thermal runaway suppression, to avoid fiercer thermal runaway caused by a possible fire, and reduce a fire intensity degree. Optionally, when receiving only the alarm information input by the smoke sensor 111 or the temperature sensor 112, the fire suppression system controller may also perform a fire extinguishing operation. Optionally, in another embodiment, in response to the fire pre-warning information input by the fire suppression system controller 114, the energy storage system controller 124 may also indicate only the execution unit to exhaust gas, and does not need to cut off energy charging and energy supply temporarily. Alternatively, the energy storage system controller 124 may not indicate the execution unit to perform a fire suppression operation, but issue an alarm by using an alarm apparatus or a user interaction interface of the energy storage system. This is not limited in this application.

Embodiment 3

Figure 5:
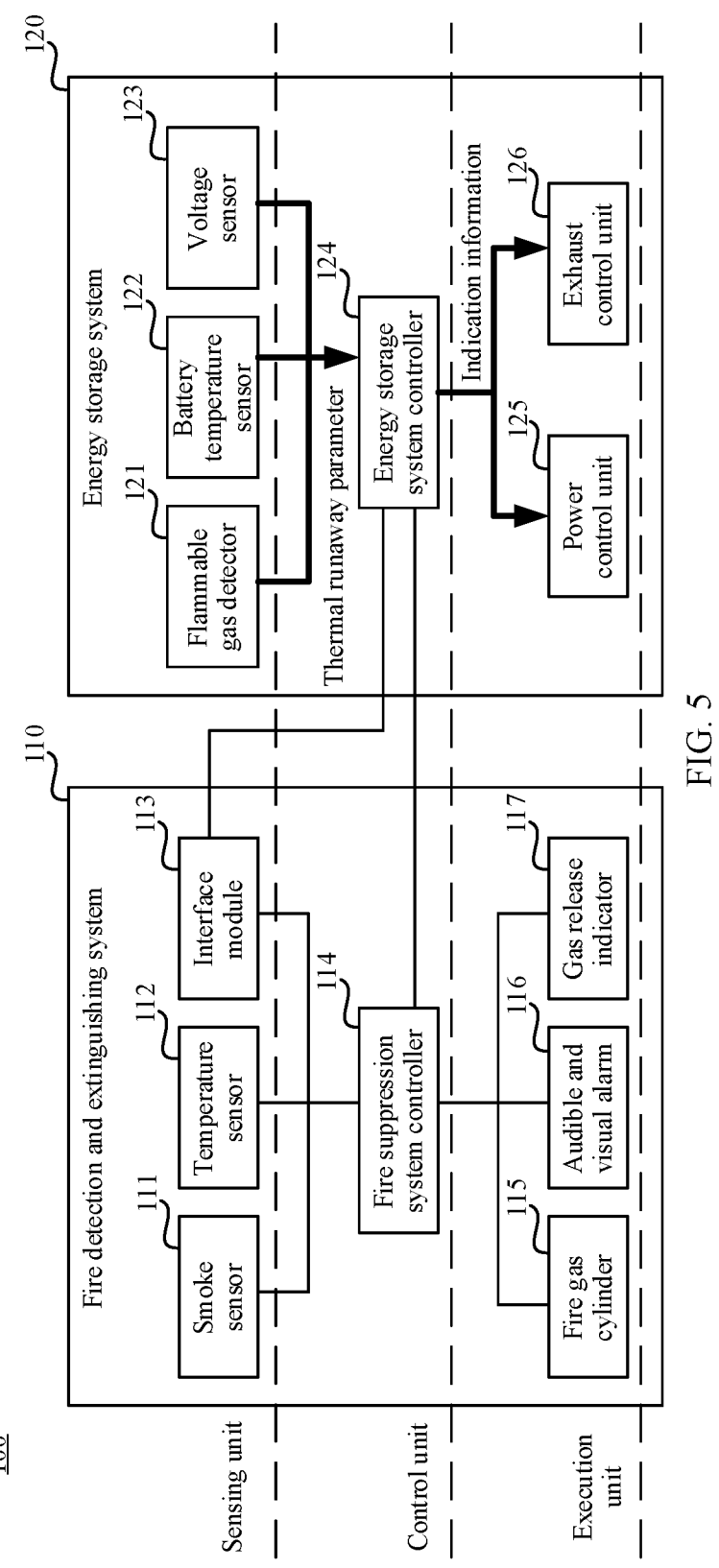
FIG. 5 is a schematic diagram of an example of module interaction in a fire control method applied to an early thermal runaway scenario.

An embodiment of this application further provides a fire control method applied to an early thermal runaway phase. As shown in FIG. 2a, the fire control system in this embodiment of this application may intervene in the early thermal runaway phase, to further reduce a fire risk caused by thermal runaway. FIG. 5 is a schematic diagram of an example of module interaction in a fire control method of an early thermal runaway scenario. With reference to FIG. 5, the fire control method includes:

The energy storage system controller 124 receives thermal runaway parameters input by the flammable gas detector 121, the battery temperature sensor 122, and the voltage sensor 123. As described above, an early thermal runaway condition may be set for the energy storage system controller, and the early thermal runaway condition indicates that early thermal runaway occurs, and indicate the energy storage system controller 124 to perform an early thermal runaway control operation.

For example, the energy storage system controller 124 may determine, based on the received thermal runaway parameter and the early thermal runaway condition, whether early thermal runaway occurs.

Optionally, in this embodiment of this application, the early thermal runaway condition includes but is not limited to:

(1) A flammable gas concentration parameter detected by any flammable gas detector 121 is greater than a flammable gas concentration threshold c, and a battery surface temperature parameter detected by any battery temperature sensor 122 is greater than a maximum allowable battery working temperature threshold.

(2) Flammable gas concentration thresholds detected by at least two flammable gas detectors 121 are greater than a flammable gas concentration threshold d. The flammable gas concentration threshold b is greater than the flammable gas concentration threshold a that is greater than the flammable gas concentration threshold d that is greater than the flammable gas concentration threshold c.

When detecting that the thermal runaway parameter meets any one of the conditions (1) and (2) in the early thermal runaway condition, the energy storage system controller 124 may determine that the early thermal runaway condition is met, that is, determine that early thermal runaway occurs.

Optionally, in another embodiment, the early thermal runaway condition may also include but is not limited to:

(1) Flammable gas concentration thresholds detected by at least two flammable gas detectors 121 are greater than a flammable gas concentration threshold d.

(2) A battery surface temperature parameter detected by any battery temperature sensor 122 is greater than a maximum allowable battery working temperature. The maximum allowable battery working temperature in the early thermal runaway condition is lower than the maximum allowable battery working temperature in the fierce thermal runaway condition.

It should be noted that the fierce thermal runaway condition in this application is merely an example, and may actually include more or fewer conditions. This is not limited in this application.

In an example, the energy storage system controller 124 determines, based on the received thermal runaway parameter and the early thermal runaway condition, that early thermal runaway occurs, and the energy storage system controller 124 performs an early thermal runaway control operation. In another example, if the energy storage system controller 124 determines, based on the received thermal runaway parameter and the early thermal runaway condition, that no early thermal runaway occurs, the energy storage system controller 124 continues to perform monitoring.

For example, after determining that early thermal runaway occurs, the energy storage system controller 124 sends indication information to the execution unit, to indicate a corresponding device in the execution unit to perform an early thermal runaway suppression operation.

In a possible implementation, the energy storage system controller 124 may indicate the power control unit 125 to cut off energy charging and energy supply of a battery on which the early thermal runaway occurs, and the energy storage system controller 124 may indicate the exhaust control unit 126 to exhaust gas (for a specific gas exhaust operation, refer to the foregoing description, and details are not described herein again). For example, the energy storage system controller 124 may determine, by using the received thermal runaway parameter, the battery on which the early thermal runaway occurs. For example, the energy storage system controller 124 receives battery surface temperature parameters detected by 1 to N battery temperature sensors 122. Battery surface temperature parameters reported by some (for example, two) sensors in the battery temperature sensors 122 are greater than the maximum allowable battery working temperature. The energy storage system controller 124 may determine that batteries detected by the some sensors are batteries on which the early thermal runaway occurs. The energy storage system controller 124 may send indication information to the power control unit 125, to indicate the power control unit 125 to cut off energy charging and energy supply of the some batteries on which the early thermal runaway occurs.

In another possible implementation, the energy storage system controller 124 may also indicate, in the early thermal runaway phase, the power control unit 125 to cut off energy charging and energy supply of all batteries, and indicate the exhaust control unit 126 to exhaust gas. It should be noted that after the energy storage system 120 performs the early thermal runaway control operation, the sensing unit and the control unit in the energy storage system 120 continue to perform monitoring to detect whether fierce thermal runaway occurs. In an example, after detecting that fierce thermal runaway occurs, the energy storage system controller 124 may perform suppression based on the foregoing method. In another example, after the energy storage system 120 performs the early thermal runaway control operation, if the energy storage system controller 124 determines, based on the received thermal runaway parameter, that the early thermal runaway is suppressed, that is, the thermal runaway parameter does not meet the early thermal runaway condition, and no fierce thermal runaway occurs, the energy storage system controller 124 may send indication information to the execution unit after predetermined duration (for example, five minutes, which may be set based on an actual requirement, and is not limited in this application), to indicate the execution unit to stop the early thermal runaway suppression operation. For example, the energy storage system controller 124 sends indication information to the power control unit 125, to indicate the power control unit 125 to charge and supply energy to the foregoing some batteries again. In addition, the energy storage system controller 124 sends indication information to the exhaust control unit 126, to indicate the exhaust control unit 126 to stop exhausting gas. In response to the indication of the energy storage system controller 124, the power control unit 125 charges and supplies energy to the foregoing some batteries again. In addition, the exhaust control unit 126 stops exhausting gas in response to the indication of the energy storage system controller 124. It should be noted that if some operations in the early thermal runaway control operation and the fierce thermal runaway control operation are coincident, when the fierce thermal runaway control operation is performed, the coincident operation may not be performed anymore. For example, the energy storage system controller 124 indicates, in the early thermal runaway phase, the power control unit 125 to cut off energy charging and energy supply of all batteries. In addition, the energy storage system controller 124 performs monitoring based on the received thermal runaway parameter. The thermal runaway parameter always meets the early thermal runaway condition, that is, the execution unit continuously performs early thermal runaway suppression. Then, when performing the early thermal runaway suppression, the energy storage system controller 124 determines, based on the received thermal runaway parameter, that fierce thermal runaway occurs. The energy storage system controller 124 may perform the foregoing fierce thermal runaway control operation. The fierce thermal runaway control operation described above includes indicating the power control unit 125 to cut off power supplies of all batteries. Because energy charging and energy supply of the batteries are cut off in the early thermal runaway phase, and the cut-off state is still maintained at present, the energy storage system controller 124 may not repeatedly indicate the power control unit 125. Optionally, the energy storage system controller 124 may also repeatedly indicate the power control unit 125 to perform an operation of cutting off energy charging and energy supply. This is not limited in this application.

It may be understood that, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on a particular application and a design constraint of a respective technical solution. A person skilled in the art may use different methods to implement the described functions for each particular application with reference to embodiments, but it should not be considered that this implementation goes beyond the scope of this application.

Figure 6:
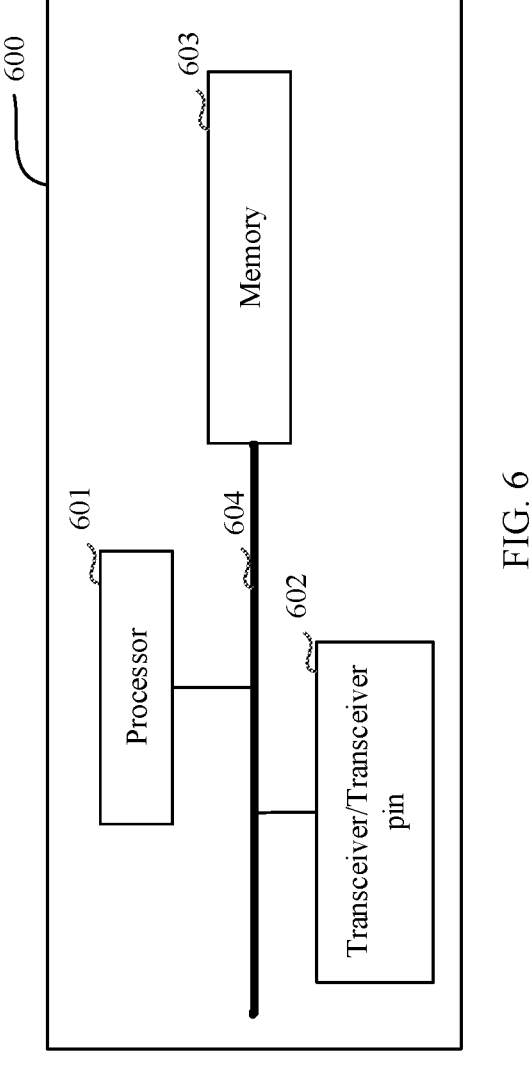
FIG. 6 is a schematic diagram of a structure of an example of an apparatus.

In an example, FIG. 6 is a schematic block diagram of an apparatus 600 according to an embodiment of this application. The apparatus 600 may include a processor 601 and a transceiver/transceiver pin 602, and optionally, further include a memory 603.

The components of the apparatus 600 are coupled together by using a bus 604. In addition to a data bus, the bus 604 further includes a power bus, a control bus, and a status signal bus. However, for clear description, various types of buses in the figure are referred to as the bus 604.

Optionally, the memory 603 may be configured to store instructions in the foregoing method embodiments. The processor 601 may be configured to: execute the instructions in the memory 603, control a receive pin to receive a signal, and control a transmit pin to send a signal.

The apparatus 600 may be the energy storage system controller, the fire suppression system controller, a chip of the energy storage system controller, or a chip of the fire suppression system controller in the foregoing method embodiments.

All related content of the steps in the foregoing method embodiment may be referenced to function descriptions of corresponding function modules, and details are not described herein again.

This embodiment further provides a computer storage medium. The computer storage medium stores computer instructions. When the computer instructions are run on an electronic device, the electronic device is enabled to perform the foregoing related method steps, to implement methods in accordance with the foregoing embodiments.

This embodiment further provides a computer program product. When the computer program product runs on a computer, the computer is enabled to perform the foregoing related steps, to implement methods in accordance with the foregoing embodiments.

In addition, an embodiment of this application further provides an apparatus. The apparatus may be a chip, a component, or a module. The apparatus may include a processor and a memory that are connected. The memory is configured to store computer-executable instructions. When the apparatus runs, the processor may execute the computer-executable instructions stored in the memory to enable the chip to perform methods in accordance with the foregoing method embodiments.

Methods or algorithm steps described in combination with the content disclosed in embodiments of this application may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium known in the art. For example, a storage medium is coupled to a processor, so that the processor can read information from the storage medium and write information into the storage medium. Certainly, the storage medium may alternatively be a component of the processor. The processor and the storage medium may be disposed in an application-specific integrated circuit (ASIC).

A person skilled in the art should be aware that, in the foregoing one or more examples, functions described in embodiments of this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a dedicated computer.

The term "and/or" in this specification describes only an association relationship between associated objects, and indicates that three relationships may exist. For example, A and/or B may represent: Only A exists, both A and B exist, and only B exists.

In this specification and claims in embodiments of this application, the terms "first", "second", and the like are intended to distinguish between different objects but do not indicate a particular order of the objects. For example, a first target object, a second target object, and the like are used to distinguish between different target objects, but are not used to describe a particular order of the target objects.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In descriptions of embodiments of this application, unless otherwise stated, "a plurality of" means two or more than two. For example, a plurality of processing units mean two or more processing units, and a plurality of systems mean two or more systems.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the protection scope of the claims.

What is claimed is:

1. An energy storage system, comprising:
a first sensing unit comprising a first temperature sensor and a smoke sensor;
a second sensing unit comprising at least one of a flammable gas sensor, a second temperature sensor, or a voltage sensor;
an energy storage system controller;
a fire suppression system controller;
a fire extinguishing device; and
one or more batteries;
wherein the first temperature sensor is configured to:
detect a temperature value of the energy storage system; and
after detecting that the temperature value exceeds a first temperature threshold, send first alarm information to the fire suppression system controller;
wherein the smoke sensor is configured to:

detect a smoke concentration value of the energy storage system; and
after detecting that the smoke concentration value exceeds a smoke concentration threshold, send second alarm information to the fire suppression system controller;
wherein the second sensing unit is configured to:
detect a first thermal runaway parameter of the energy storage system; and
send the first thermal runaway parameter to the energy storage system controller;
wherein the first thermal runaway parameter comprises at least one of the following: a first flammable gas concentration of the energy storage system, a first temperature value of the one or more batteries, or a first voltage value of the one or more batteries;
wherein the energy storage system controller is configured to: based on detecting that the first thermal runaway parameter meets a thermal runaway condition, send third alarm information to the fire suppression system controller, and stop energy charging or energy supply of the one or more batteries; and
wherein the fire suppression system controller is configured to: based on receiving at least one of the first alarm information, the second alarm information, or the third alarm information, indicate that the fire extinguishing device is to perform a fire extinguishing operation.

2. The system according to claim 1,
wherein the flammable gas sensor is configured to: detect the first flammable gas concentration of the energy storage system, and transmit the first flammable gas concentration to the energy storage system controller;
wherein the second temperature sensor is configured to: detect the first temperature value of the one or more batteries, and transmit the first temperature value to the energy storage system controller; and
wherein the voltage sensor is configured to: detect the first voltage value of the one or more batteries, and transmit the first voltage value to the energy storage system controller.

3. The system according to claim 2, wherein the thermal runaway condition comprises at least one of the following:
a temperature value rise rate of the one or more batteries is greater than a temperature rise rate threshold;
the first temperature value of the one or more batteries is greater than a second temperature threshold;
the first voltage value of the one or more batteries is less than a voltage threshold; or
the first flammable gas concentration is greater than a first flammable gas concentration threshold.

4. The system according to claim 1, wherein the energy storage system further comprises a communications interface, wherein the communications interface is electrically connected to the energy storage system controller and the fire suppression system controller, and wherein the communications interface is configured to: receive the third alarm information output by the energy storage system controller, and transmit the third alarm information to the fire suppression system controller.

5. The system according to claim 1, wherein the fire suppression system controller is configured to: based on receiving the first alarm information and the second alarm information and not receiving the third alarm information, send fourth alarm information to the energy storage system controller, and indicate that the fire extinguishing device is to perform the fire extinguishing operation; and wherein the energy storage system controller is further configured to: in response to the fourth alarm information, stop energy charging or energy supply of the one or more batteries.

6. The system according to claim 2, wherein the one or more batteries comprise n batteries;

wherein the second sensing unit comprises m flammable gas concentration sensors, p voltage sensors, and q second temperature sensors, wherein m, p, and q are all positive integers greater than or equal to n;

wherein each of the n batteries corresponds to at least one second temperature sensor, and a single second temperature sensor is configured to detect a surface temperature of a corresponding battery;

wherein each of the n batteries corresponds to at least one voltage sensor, and a single voltage sensor is configured to detect a voltage of a corresponding battery; and wherein each of the n batteries corresponds to at least one flammable gas concentration sensor, and a single flammable gas concentration sensor is configured to detect a flammable gas concentration near a corresponding battery.

7. The system according to claim 6, wherein the thermal runaway condition indicates that a first thermal runaway occurs.

8. The system according to claim 7, wherein the second sensing unit is further configured to: detect a second thermal runaway parameter of the energy storage system, and send the second thermal runaway parameter to the energy storage system controller, wherein the second thermal runaway parameter comprises at least one of the following: a second flammable gas concentration of the energy storage system, a second temperature value of the one or more batteries, or a second voltage value of the one or more batteries; and wherein the energy storage system controller is further configured to: based on detecting that the second thermal runaway parameter meets a second thermal runaway condition, start an exhaust system of the energy storage system, and/or stop energy charging or energy supply of a battery on which a second thermal runaway occurs in the n batteries, wherein the second thermal runaway condition indicates that the second thermal runaway occurs, wherein a thermal runaway degree of the second thermal runaway is lower than a thermal runaway degree of the first thermal runaway.

9. The system according to claim 8, wherein the second thermal runaway condition comprises at least one of the following:

a surface temperature that is of a battery and that is detected by at least one of the q second temperature sensors is greater than a third temperature threshold, and a flammable gas concentration detected by any of the m flammable gas concentration sensors is greater than a second flammable gas concentration threshold; or flammable gas concentrations detected by at least two of the m flammable gas concentration sensors are greater than a third flammable gas concentration threshold, wherein the second flammable gas concentration threshold is less than or equal to the third flammable gas concentration threshold.

10. The system according to claim 1, wherein the fire extinguishing device is configured to perform a fire extinguishing operation in response to an indication of the fire suppression system controller.

11. The system according to claim 10, wherein the fire extinguishing device comprises at least one of a fire gas cylinder filled with a fire extinguishing medium, an audible and visual alarm, or a gas release indicator; and wherein the fire extinguishing operation performed by the fire extinguishing device comprises at least one of the following:

spraying the fire extinguishing medium by using the fire gas cylinder;

issuing an alarm by using the audible and visual alarm; or performing luminous indication by the gas release indicator.

12. A method for controlling an energy storage system, comprising:

detecting, by a first temperature sensor of a first sensing unit of the energy storage system, a temperature value of the energy storage system, and after detecting that the temperature value exceeds a first temperature threshold, sending first alarm information to a fire suppression system controller of the energy storage system;

detecting, by a smoke sensor of the first sensing unit, a smoke concentration value of the energy storage system, and after detecting that the smoke concentration value exceeds a smoke concentration threshold, sending second alarm information to the fire suppression system controller;

detecting, by a second sensing unit of the energy storage system, a first thermal runaway parameter of the energy storage system, and sending the first thermal runaway parameter to an energy storage system controller of the energy storage system, wherein the second sensing unit comprises at least one of a flammable gas sensor, a second temperature sensor, or a voltage sensor, and wherein the first thermal runaway parameter comprises at least one of the following: a first flammable gas concentration of the energy storage system, a first temperature value of one or more batteries of the energy storage system, or a first voltage value of the one or more batteries;

based on detecting that the first thermal runaway parameter meets a thermal runaway condition, sending, by the energy storage system controller, third alarm information to the fire suppression system controller, and stopping energy charging or energy supply of the one or more batteries; and based on receiving at least one of the first alarm information, the second alarm information, or the third alarm information, indicating, by the fire suppression system controller, that a fire extinguishing device of the energy storage system is to perform a fire extinguishing operation.

13. The method according to claim 12, wherein detecting the first thermal runaway parameter of the energy storage system comprises at least one of:

detecting, by the flammable gas sensor, the first flammable gas concentration of the energy storage system, and transmitting the first flammable gas concentration to the fire suppression system controller;

detecting, by the second temperature sensor, the first temperature value of the one or more batteries, and transmitting the first temperature value to the energy storage system controller; or detecting, by the voltage sensor, the first voltage value of the one or more batteries, and transmitting the first voltage value to the energy storage system controller.

14. The method according to claim 13, wherein the thermal runaway condition comprises at least one of the following:

a temperature value rise rate of the one or more batteries is greater than a temperature rise rate threshold;

the first temperature value of the one or more batteries is greater than a second temperature threshold;

the first voltage value of the one or more batteries is less than a voltage threshold; or the first flammable gas concentration is greater than a first flammable gas concentration threshold.

15. The method according to claim 12, wherein the energy storage system further comprises a communications interface, wherein the communications interface is electrically connected to the energy storage system controller and the fire suppression system controller, and wherein sending the third alarm information to the fire suppression system controller comprises: receiving, by the communications interface, the third alarm information output by the energy storage system controller, and transmitting the third alarm information to the fire suppression system controller.

16. The method according to claim 12, wherein indicating that the fire extinguishing device is to perform a fire extinguishing operation comprises:

based on the first alarm information and the second alarm information being received and the third alarm information not being received, sending, by the fire suppression system controller, fourth alarm information to the energy storage system controller, and indicating that the fire extinguishing device is to perform the fire extinguishing operation; and in response to the fourth alarm information, stopping, by the energy storage system controller, energy charging or energy supply of the one or more batteries.

17. The method according to claim 13, wherein the one or more batteries comprise n batteries;

wherein the second sensing unit comprises m flammable gas concentration sensors, p voltage sensors, and q second temperature sensors, wherein m, p, and q are all positive integers greater than or equal to n;

wherein each of the n batteries corresponds to at least one second temperature sensor, and a single second temperature sensor is configured to detect a surface temperature of a corresponding battery;

wherein each of the n batteries corresponds to at least one voltage sensor, and a single voltage sensor is configured to detect a voltage of a corresponding battery; and wherein each of the n batteries corresponds to at least one flammable gas concentration sensor, and a single flammable gas concentration sensor is configured to detect a flammable gas concentration near a corresponding battery.

18. The method according to claim 17, wherein the thermal runaway condition indicates that a first thermal runaway occurs.

19. The method according to claim 18, wherein the method further comprises:

detecting, by the second sensing unit, a second thermal runaway parameter of the energy storage system, and sending the second thermal runaway parameter to the energy storage system controller, wherein the second thermal runaway parameter comprises at least one of the following: a second flammable gas concentration of the energy storage system, a second temperature value of the one or more batteries, or a second voltage value of the one or more batteries; and based on detecting that the second thermal runaway parameter meets a second thermal runaway condition, starting, by the energy storage system controller, an exhaust system of the energy storage system, and/or stopping energy charging or energy supply of a battery on which a second thermal runaway occurs in the n batteries, wherein the second thermal runaway condition indicates that the second thermal runaway occurs, wherein a thermal runaway degree of the second thermal runaway is lower than a thermal runaway degree of the first thermal runaway.

20. The method according to claim 19, wherein the second thermal runaway condition comprises at least one of the following:

a surface temperature that is of a battery and that is detected by at least one of the q second temperature sensors is greater than a third temperature threshold, and a flammable gas concentration detected by any of the m flammable gas concentration sensors is greater than a second flammable gas concentration threshold; or flammable gas concentrations detected by at least two of the m flammable gas concentration sensors are greater than a third flammable gas concentration threshold, wherein the second flammable gas concentration threshold is less than or equal to the third flammable gas concentration threshold.

* * * * *